(12) United States Patent
Ogawa et al.

(10) Patent No.: US 10,885,726 B2
(45) Date of Patent: Jan. 5, 2021

(54) VEHICLE TEST SYSTEM, RECORDING MEDIUM RECORDED WITH VEHICLE TEST SYSTEM PROGRAM, VEHICLE TEST METHOD, AND RUNNING RESISTANCE SETTING APPARATUS

(71) Applicant: HORIBA, Ltd., Kyoto (JP)

(72) Inventors: Yasuhiro Ogawa, Kyoto (JP); Masayuki Adachi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 322 days.

(21) Appl. No.: 15/623,771

(22) Filed: Jun. 15, 2017

(65) Prior Publication Data

US 2018/0040176 A1 Feb. 8, 2018

(30) Foreign Application Priority Data

Aug. 2, 2016 (JP) .................. 2016-151840

(51) Int. Cl.
*G07C 5/08* (2006.01)
*G01M 17/007* (2006.01)

(52) U.S. Cl.
CPC ......... *G07C 5/0808* (2013.01); *G01M 17/007* (2013.01); *G07C 5/0816* (2013.01)

(58) Field of Classification Search
None
See application file for complete search history.

(56) References Cited

U.S. PATENT DOCUMENTS 5,309,139 A * 5/1994 Austin .................. G07C 5/004
340/438
5,531,107 A * 7/1996 Ganzhorn, Jr. .......... G01L 3/22
73/116.06

(Continued)

FOREIGN PATENT DOCUMENTS

CN 102762970 A 10/2012
CN 105092257 A 11/2015

(Continued)

OTHER PUBLICATIONS

EESR dated Dec. 22, 2017 issued for European Patent Application No. 17 175 449.2.

(Continued)

*Primary Examiner* — Dale W Hilgendorf
*Assistant Examiner* — Alexander C. Bost
(74) *Attorney, Agent, or Firm* — Brooks Kushman P..C.

(57) ABSTRACT

In order to prevent the occurrence of a user's erroneous operation as well as preventing an inappropriate road load from being set in a dynamometer, a vehicle test system that tests the performance of a vehicle or a part of the vehicle is adapted to include a dynamometer adapted to provide a load to the vehicle or the part of the vehicle, an actual running data acquisition part adapted to acquire actual running data from an actual running vehicle running on a road, a road load calculation part adapted to, on the basis of the actual running data, calculate a road load used to test the performance of the vehicle or the part of the vehicle, a road load data setting part adapted to set the road load in the dynamometer, and an output part adapted to, before the setting in the dynamometer, viewably output the road load to a user.

12 Claims, 8 Drawing Sheets

(56) References Cited

U.S. PATENT DOCUMENTS

| | | | | |
|---|---|---|---|---|
| 6,457,351 | B1 * | 10/2002 | Yamamoto | G01M 17/0072 |
| | | | | 73/116.05 |
| 7,103,460 | B1 * | 9/2006 | Breed | B60C 23/0408 |
| | | | | 701/29.1 |
| 9,020,659 | B2 | 4/2015 | Harris et al. | |
| 2007/0088472 | A1 * | 4/2007 | Ganzhorn, Jr. | G01M 15/102 |
| | | | | 701/31.4 |
| 2013/0024066 | A1 * | 1/2013 | Geilen | G07C 5/0808 |
| | | | | 701/29.6 |
| 2013/0060500 | A1 | 3/2013 | Narumi | |
| 2013/0338849 | A1 * | 12/2013 | Harris | G06F 17/00 |
| | | | | 701/1 |
| 2016/0245724 | A1 | 8/2016 | Sasaki et al. | |

FOREIGN PATENT DOCUMENTS

| | | | |
|---|---|---|---|
| CN | 105092259 | A | 11/2015 |
| CN | 105092260 | A | 11/2015 |
| CN | 105556275 | A | 5/2016 |
| EP | 2246686 | A | 11/2010 |
| EP | 2947448 | A | 11/2015 |
| JP | 01-173848 | A | 7/1989 |
| JP | 01-263531 | A | 10/1989 |
| WO | 0165226 | A1 | 9/2001 |

OTHER PUBLICATIONS

Office Action dated Jul. 3, 2020 issued for Chinese Patent Application No. 201710432736.X, 18 pgs.
Decision to grant a patent dated Sep. 8, 2020 issued for Japanese Patent Application No. 2017-100346, 5 pgs.

* cited by examiner

VEHICLE TEST SYSTEM, RECORDING MEDIUM RECORDED WITH VEHICLE TEST SYSTEM PROGRAM, VEHICLE TEST METHOD, AND RUNNING RESISTANCE SETTING APPARATUS

CROSS-REFERENCE TO RELATED APPLICATION

This application claims priority to JP Application No. 2016-151840, filed Aug. 2, 2016, the disclosure of which is incorporated in its entirety by reference herein.

TECHNICAL FIELD

The present invention relates to a vehicle test system and vehicle test method adapted to test a vehicle or a part of the vehicle, a recording medium recorded with a vehicle test system program used for the vehicle test system, and an automatic road load (running resistance) setting apparatus adapted to set a road load in a dynamometer.

BACKGROUND ART

For example, in a test for measuring the fuel consumption of a vehicle, it is usually necessary to set a load in a chassis dynamometer so as to reproduce a road load that is received by a test vehicle when the test vehicle runs on a road. For this reason, it is adapted to preliminarily actually run the vehicle on the road and measure the road load at the time by, for example, a coast-down method.

Specifically, a road load is calculated using the coast-down method at each vehicle speed, a target road load is obtained by compensating the road load for the effect of temperature, atmospheric pressure, and the like at the time of the actual run, and the target road load is set in the chassis dynamometer.

Meanwhile, when a user's operation intervenes during a period from the calculation of the road load to the setting of the target road load, there occurs a possibility that for example, a user's erroneous operation prevents the setting of a correct target road load and thereby the test cannot be appropriately performed, or in order to obtain a favorable test result, a value such as the value of the target road load is intentionally changed and set.

From such a viewpoint, a road load setting apparatus adapted to, in order to prevent the occurrence of a user's erroneous operation, eliminate the need for user's operations by instructing a controller to calculate and set a road load is described in Reference 1.

However, in the above-described road load setting apparatus, the problem of performing a useless test may occur because a user cannot check the road load set by the controller, and even when as the road load, an inappropriate value is calculated, the inappropriate road load is set.

CITATION LIST

Patent Literature

Patent Literature 1: JP-A 1-173848

SUMMARY OF INVENTION

Technical Problem

Therefore, the present invention is made in order to solve the above-described problems at once, and a main object thereof is to prevent the occurrence of a user's erroneous operation as well as preventing an inappropriate road load from being set in a dynamometer.

Solution to Problem

That is, a vehicle test system according to the present invention is one that tests the performance of a vehicle or a part of the vehicle, and the vehicle test system includes: a dynamometer adapted to provide a load to the vehicle or the part of the vehicle; an actual running data acquisition part adapted to acquire actual running data from an actual running vehicle running on a road; a road load calculation part adapted to, on the basis of the actual running data, calculate a road load used to test the performance of the vehicle or the part of the vehicle; a road load data setting part adapted to set the road load in the dynamometer; and an output part adapted to, before the setting in the dynamometer, viewably output the road load to a user.

Note that the term "the road load used to test the performance" here refers to a concept including the value of a target road load calculated from an actual road load placed on the actual running vehicle, a calculation expression representing the target road load, coefficients used in the calculation expression, and the like.

In such a vehicle test system, since the road load is automatically calculated and set in the dynamometer, the occurrence of a user's erroneous operation can be prevented.

In addition, since a user can check the road load to be set in the dynamometer, when the checked road load is inappropriate as a setting value for the dynamometer, it is possible to avoid a useless test, such as interrupting the test.

In order to surely prevent the occurrence of a user's erroneous operation, the vehicle test system is preferably configured such that the user cannot edit the road load before the setting in the dynamometer.

When the road load is a value calculated in accordance with a predetermined regulation, and multiple road loads are calculated in accordance with the predetermined regulation, in order to set an optimum value among the road loads in the dynamometer, a configuration in which the vehicle test system further includes a reception part adapted to receive one or more values selected by the user, and the road load data setting part sets the road loads received by the reception part in the dynamometer can be cited.

Also, as another embodiment adapted to set the optimum value among the above-described multiple road loads in the dynamometer, a configuration in which the vehicle test system further includes a selection part adapted to automatically select one or more road loads meeting a predetermined condition, and the road load data setting part sets the road loads selected by the selection part in the dynamometer can be cited.

Meanwhile, as standards and/or regulations prescribed in each country, an environmental condition such as a numerical value range may be set for the value of environmental data at the time of acquisition of the actual running data. Therefore, in order to prevent an inappropriate road load from being set in the dynamometer, it is preferable that the vehicle test system further includes a filtering part adapted to, when the environmental data at the time of acquisition of the actual running data does not meet a predetermined environmental condition, exclude the road load calculated by the road load calculation part from the setting by the road load data setting part.

It is preferable that the road load data setting part sets environmental data at the time of acquisition of the actual running data in the dynamometer together with the road load.

Such a configuration makes it possible for a user to check an environment at the time of an actual run, and therefore, in cases such as when the environment at the time of the actual run is significantly different from a usual one, by avoiding the use of the road load obtained from the actual run, an inappropriate road load can be prevented from being set in the dynamometer.

It is preferable that the road load data setting part sets at least any of the vehicle weight of the actual running vehicle, the vehicle inertia weight of the actual running vehicle, and a coast-down time during an actual run in the dynamometer together with the road load.

Such a configuration makes it possible to reproduce a test using the road load calculated by the road load calculation part by making the dynamometer calculate a road load.

Meanwhile, for example, when a procedure at the time of an actual run of a vehicle is different depending on a driver, it is impossible to ensure fairness in road load measurement, and depending on a driver, difference in test result may occur.

For this reason, in order to fairly measure a road load, it is preferable that the vehicle test system further includes a guidance part adapted to provide guidance for running in accordance with the predetermined regulation to a driver during a run of the actual running vehicle.

Such a configuration makes it possible for a driver to actually run a vehicle in the same procedure and conditions, and therefore a road load can be fairly measured.

In order to avoid a useless test, it is preferable that when environmental data at the time of acquisition of the actual running data does not meet a predetermined condition, the guidance part provides guidance for indicating interruption of the test or remeasurement.

Also, a recording medium recorded with a vehicle test program according to the present invention is one recorded with a vehicle test system program used for a vehicle test system including a dynamometer adapted to provide a load to a vehicle or a part of the vehicle, and the vehicle test system program instructs a computer to fulfill functions as: an actual running data acquisition part adapted to acquire actual running data from an actual running vehicle running on a road; a road load calculation part adapted to, on the basis of the actual running data, calculate a road load used to test the performance of the vehicle or the part of the vehicle; a road load data setting part adapted to set the road load in the dynamometer; and an output part adapted to, before the setting in the dynamometer, viewably output the road load to a user.

Further, a vehicle test method according to the present invention is one that is used for a vehicle test system including a dynamometer adapted to provide a load to a vehicle or a part of the vehicle and tests the performance of the vehicle or the part of the vehicle, and the vehicle test method includes: a road load calculation step of, on the basis of actual running data acquired from an actual running vehicle running on a road, calculating a road load used to test the performance of the vehicle or the part of the vehicle; a road load data setting step of setting the road load in the dynamometer; and an output step of, before the road load data setting step, viewably outputting the road load to a user.

In addition, a road load setting apparatus according to the present invention is one that sets a road load in a dynamometer adapted to provide a load to a vehicle or a part of the vehicle, and the road load setting apparatus includes: a road load calculation part adapted to, on the basis of actual running data acquired from an actual running vehicle running on a road, calculate a road load used to test the performance of the vehicle or the part of the vehicle; a road load data setting part adapted to set the road load in the dynamometer; and an output part adapted to, before the setting in the dynamometer, viewably output the road load to a user.

Such a recording medium recorded with a vehicle test system program, vehicle test method, and road load setting apparatus can produce the same working effects as those of the above-described vehicle test system.

Advantageous Effects of Invention

According to the present invention configured as described above, it is possible to prevent the occurrence of a user's erroneous operation as well as preventing an inappropriate road load from being set in a dynamometer.

DESCRIPTION OF EMBODIMENTS

In the following, one embodiment of a vehicle test system according to the present invention will be described with reference to the drawings.

Figure 1:
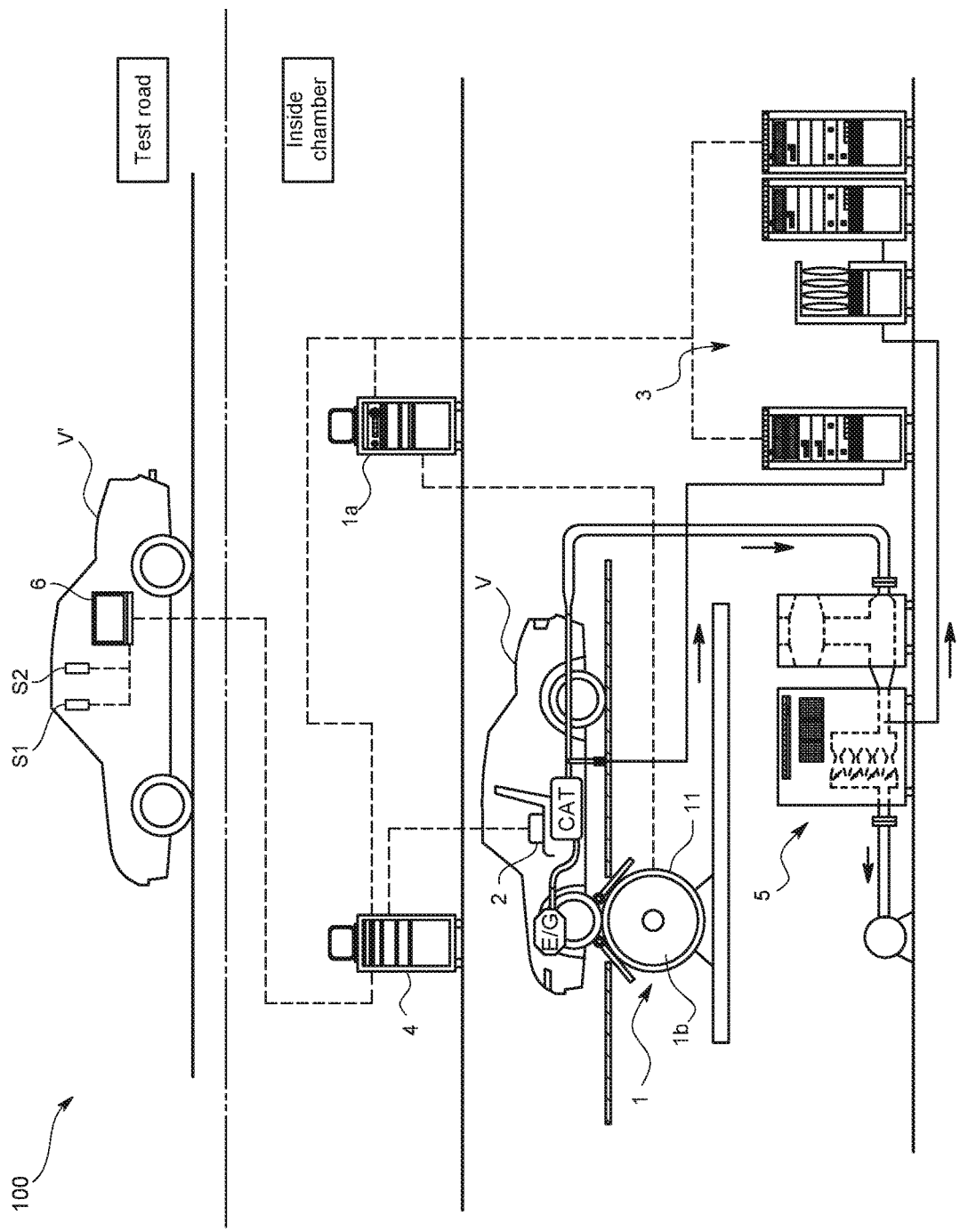
FIG. 1 is a schematic diagram illustrating the overall configuration of a vehicle test system of the present embodiment.

A vehicle test system 100 according to the present embodiment is one for performing a running test on a vehicle V in a predetermined driving mode in a chamber called a cell to analyze exhaust gas and measure a fuel consumption during the running test, and for performing a certification test, a durability test, and the like, and as illustrated in FIG. 1, includes at least a chassis dynamometer 1, management apparatus 4, and the like. The vehicle test system 100 of the present embodiment is one adapted to perform the exhaust gas analysis, and includes the chassis dynamometer 1, an automatic driving apparatus 2, an exhaust gas measuring apparatus 3, the management apparatus 4, and the like. Note that the vehicle test system 100 may be one configured such that in place of the automatic driving apparatus 2, a test driver drives the vehicle V. In this case, the test driver may be provided with a driver's aid that is a driving mode display apparatus adapted to display a driving mode.

The chassis dynamometer 1 is, for example, a single axle type, and includes: a dynamometer main body 1b having a rotating drum 11 to be mounted with the drive wheels of the vehicle V, and the like; and a dynamometer control apparatus 1a that controls the rotating drum 11 to give a running load similar to that on a road to the vehicle V. The dynamometer control apparatus 1a is configured using a computer system including electronic components such as a CPU and a memory, and has a function capable of mutually communicating a control signal, data, and the like with the outside. Note that although FIG. 1 illustrates the chassis dynamometer 1 for 2WD-FF vehicles, needless to say, the chassis dynamometer 1 may be one including a pair of rotating drums at the front and rear so as to be made available for 4WD vehicles, or a twin roller type.

The automatic driving apparatus 2 is one including a driving robot that is equipped in a driver's cab to drive an accelerator pedal, a brake pedal, a clutch pedal, and the like. In addition, the automatic driving apparatus 2 is adapted to be capable of performing a performance test on the vehicle V, an engine, or a power train in accordance with, for example, various standardized regulations (such as CFR1065 and 10-mode) by controlling the driving robot in accordance with various command signals from the below-described management apparatus 4.

The exhaust gas measuring apparatus 3 is one that includes multiple gas analyzers having different measurement principles, and is capable of continuously and separately measuring respective components contained in engine exhaust gas, such as HC, $NO_X$, CO, and $CO_2$. Note that the present embodiment is configured to be capable of also measuring the weights of components such as CO, HC, and NO per unit running distance by combining with an exhaust gas constant volume sample collecting apparatus 5 adapted to sample diluted exhaust gas, which results from diluting the exhaust gas with ambient air, on a constant volume basis as sample gas. The exhaust gas measuring apparatus 3 includes a computer system configured using electronic components such as a CPU and a memory, and has a function capable of communicating a control signal, data, and the like with the outside.

The management apparatus 4 is, for example, a computer system having; a main body part including a CPU, memory, communication port, and the like; and a console including a display, and the like. In addition, the management apparatus 4 is adapted to be capable of transceiving data with the dynamometer control apparatus 1a, automatic driving apparatus 2, and exhaust gas measuring apparatus 3 through a network such as a LAN, and comprehensively controlling the dynamometer control apparatus 1a, automatic driving apparatus 2, exhaust gas measuring apparatus 3, and other equipment to acquire data. Note that in the above-described example, the management apparatus 4 and the dynamometer control apparatus 1a are described as separated apparatus, but may be configured as one integrated apparatus.

The above-described configuration allows, when a user sets a vehicle test schedule in the management apparatus 4, the management apparatus 4 to transmit commands conforming to regulations of the schedule to the dynamometer control apparatus 1a, the automatic driving apparatus 2, and the like, and control them so as to automatically perform a test in accordance with the regulations.

In addition, the vehicle test system 100 of the present embodiment is configured to be capable of automatically setting an appropriate target road load in the chassis dynamometer 1 so as to give the vehicle V on the rotating drum 11 an actual road load received by an actual running vehicle V' actually running on a road.

The vehicle test system is configured to calculate the actual road load F and the target road load $F_0$ used for the performance test in accordance with predetermined regulations. The term "predetermined regulations" here refers to a calculation method determined for obtaining a road load, and prescribed in rules such as standards, laws, and/or regulations of each country.

In the following, as an example of a method for calculating the actual road load F and the target road load $F_0$ used for the performance test, a method for calculating an actual road load F and a target road load $F_0$ at each specified speed on the basis of the following calculation expressions (1) to (5) prescribed in TRIAS (Traffic Safety and Nuisance Research Institute's Automobile Type Approval Test Standard) will be described.

Note that the actual road load F and the target road load $F_0$ may be calculated on the basis of expressions provided in another standard such as SAE or GTR prescribed in each country.

First, a method for calculating an actual road load F received by the actual running vehicle V' when the actual running vehicle V' actually runs on a road will be described.

The present embodiment is adapted to calculate the actual road load F using a so-called coast-down method, and calculates an actual road load F at each of vehicle speeds (also referred to as specified speeds) of, for example, 20 km/h, 30 km/h, 40 km/h, 50 km/h, 60 km/h, 70 km/h, 80 km/h, and 90 km/h on the basis of actual running data obtained from the actual running vehicle V' running on a test road.

An actual road load F at each specified speed is calculated by shifting a transmission into neutral to make the actual running vehicle V' coast from a speed exceeding a specified speed by 5 km/h, and measuring a coast-down time from the speed exceeding the specified speed by 5 km/h to a speed falling below the specified speed by 5 km/h in units of 0.1 seconds or less. Note that during the coast-down time measurement, neither a braking operation nor a steering operation is performed, and a clutch is kept engaged.

A coast-down time at each specified speed is measured three times for each of outward and return roads, and the average of the resulting measurements is obtained.

Here, an actual road load F at each specified speed is calculated on the basis of the following calculation expression (1) prescribed in TRIAS (Traffic Safety and Nuisance Research Institute's Automobile Type Approval Test Standard).

$$F = \frac{W + W_4}{0.36t} \qquad (1)$$

F: Actual road load at each specified speed
W: Weight of actual running vehicle V'
$W_4$: Inertia weight of rotating sections of actual running vehicle V'
t: Average coast-down time at each specified speed In order to calculate an actual road load F in this manner, as illustrated in FIGS. 1 and 2, the actual running vehicle V' is equipped with: an actual running data meter S1 adapted to measure actual running data; an environmental data meter S2 adapted to measure environmental data at the time of an actual run; and an information processing apparatus 6 adapted to acquire various pieces of data from the actual running data meter and the environmental data meter.

The actual running data refers to data obtained by running of the actual running vehicle V'. In the present embodiment, as the actual running data meter S1, at least a speed meter and a timer are used, and as the actual running data, a vehicle speed and a running time are measured.

The environmental data refers to data indicating a running environment at the time of running of the actual running vehicle V'. In the present embodiment, as the environmental data meter S2, at least a barometer, thermometer, and anemometer are used, and as the environmental data, atmospheric pressure, atmospheric temperature, wind direction, and wind speed are measured. Note that the environmental data meter S2 may be partially or entirely provided in the test road. In addition, it is not necessary to use all of the above-described components of the environmental data meter S2 but only necessary to use at least one of them.

Figure 2:
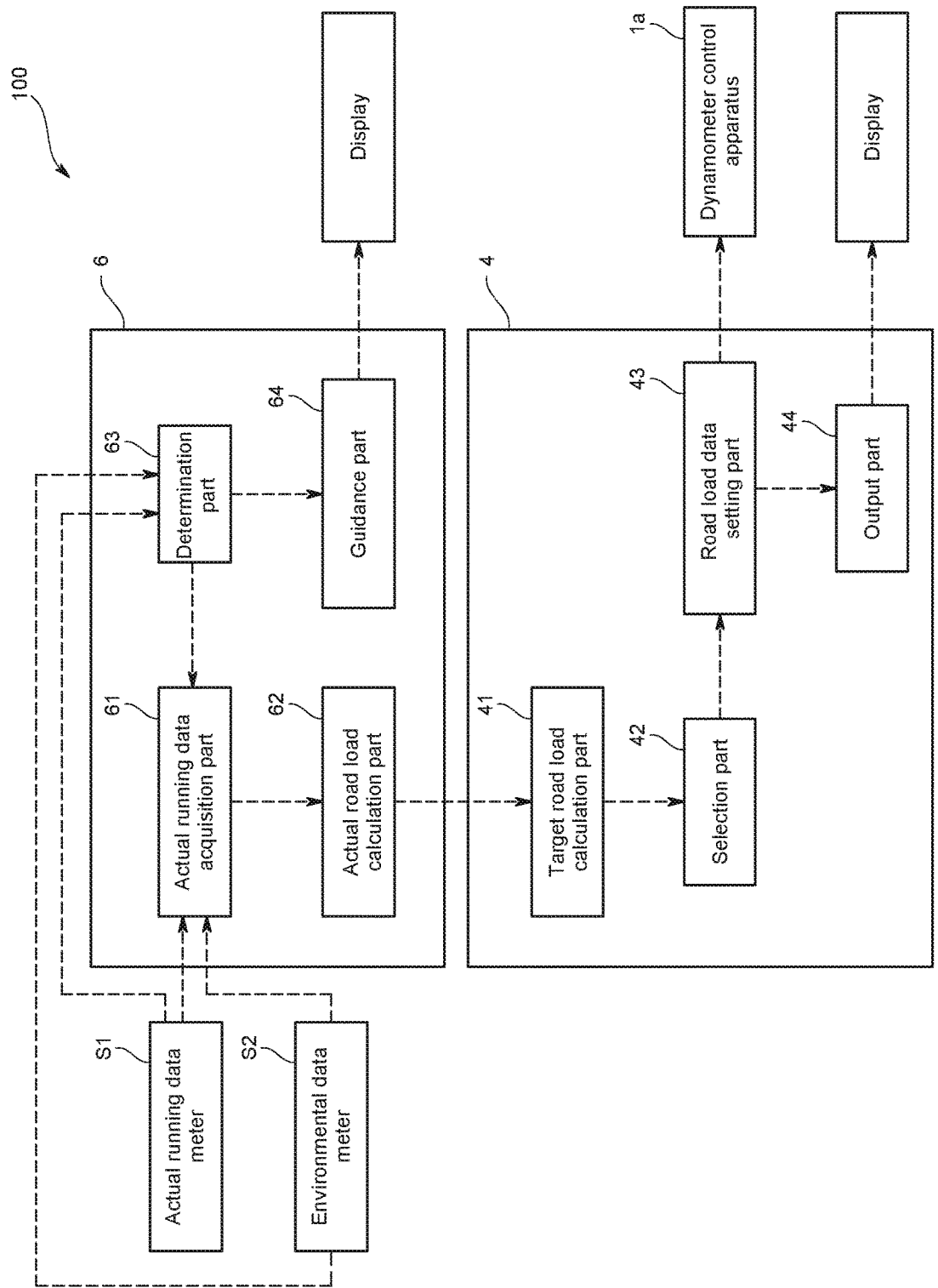
FIG. 2 is a functional block diagram illustrating the functions of the vehicle test system of the present embodiment.

The information processing apparatus 6 is one including electronic components such as a CPU, a memory, an A/D converter, and a communication interface, and as illustrated in FIG. 2, configured to function as an actual running data acquisition part 61 and an actual road load calculation part 62 by the cooperation of the CPU and its peripheral devices performed in accordance with a program stored in the memory.

Figure 3:
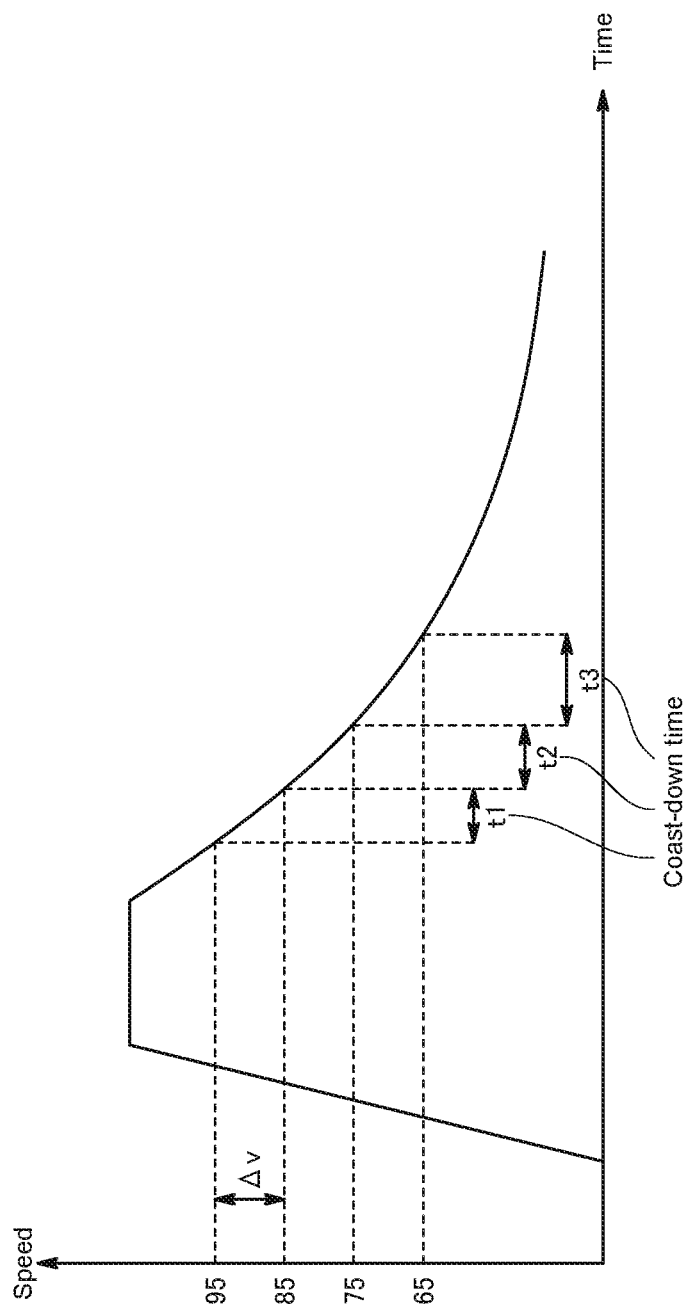
FIG. 3 is a graph explaining time-series data on vehicle speed with respect to coast-down time in the present embodiment.

The actual running data acquisition part 61 acquires the actual running data and the environmental data from the above-described actual running data meter S1 and environmental data meter S2, and also transmits these pieces of data to the actual road load calculation part 62. Note that, for example, as illustrated in FIG. 3, the actual running data includes at least time-series data on vehicle speed during a coast-down time.

The actual road load calculation part 62 receives time-series data on vehicle speed during a coast-down time transmitted from the actual running data acquisition part 61, and on the basis of the calculation expression (1), calculates an actual road load F at each vehicle speed as well as transmitting the result of the calculation to the above-described management apparatus 4.

The management apparatus 4 in the present embodiment is a road load setting apparatus adapted to automatically set a target road load $F_0$ in the chassis dynamometer 1, and as illustrated in FIG. 2, configured to function as a target road load calculation part 41, a selection part 42, and a road load data setting part 43 by the cooperation of the CPU and its peripheral devices.

Note that a road load calculation part in claims refers to a concept including a function as the above-described actual road load calculation part 62 and a function as the target road load calculation part 41.

The target road load calculation part 41 calculates a target road load $F_0$ by compensating an actual road load F calculated by the actual road load calculation part 62 for the effect due to difference in environment at the time of the actual run.

A specific calculation method is given by the coast-down method, and an actual road load F at each vehicle speed calculated in accordance with the calculation expression (1) is represented as a function of a vehicle speed as a parameter using the least squares method. This function is one given below, and represents the actual road load F as the square of the vehicle speed.

$$F = a + bV^2 \qquad (2)$$

F: Actual road load
a: Value corresponding to rolling resistance
b: Value corresponding to air resistance coefficient
V: Vehicle speed The target road load calculation part 41 compensates the coefficients a and b used in the function (2) as those under standard ambient conditions in accordance with compensation expressions (3) and (4) using the above-described environmental data, and the resulting target road load $F_0$ is obtained as a function (5).

$$a_0 = (a - bv^2)[1 + 0.00864(Te - 293)] \qquad (3)$$

$$b_0 = 0.346b\frac{Te}{P} \qquad (4)$$

$$F_0 = a_0 + b_0 V^2 \qquad (5)$$

$F_0$: Target road load
$a_0$: Value corresponding to rolling resistance in standard ambient conditions
$b_0$: Value corresponding to air resistance coefficient in standard ambient conditions
v: Average value of wind speed component parallel to test road
Te: Average temperature at test road
P: Average atmospheric pressure at test road In the present embodiment, the target road load $F_0$ obtained in this manner is calculated multiple times, and the obtained calculation results (i.e., the functions (5) respectively representing the target road loads $F_0$ as the squares of the vehicle speed) are stored in a predetermined area of the memory.

Note that the management apparatus 4 and the information processing apparatus 6 are not provided with any interface allowing the actual road load F and the target road load $F_0$ to be externally edited, thus making it impossible for a user to edit the actual road load F and the target road load $F_0$. In doing so, injustice in the exhaust gas analysis, the fuel consumption measurement, and/or the like is prevented.

The selection part 42 automatically selects one or more target road loads $F_0$ meeting predetermined conditions from among the multiple calculation results. The predetermined conditions are conditions preliminarily determined by a user, and to determine whether to meet the predetermined conditions, the coefficients (the coefficients $a_0$ and $b_0$ in this case) used for the function representing a target road load $F_0$ or the value of the target road load $F_0$ itself is used. Note that it may be adapted to, as the multiple calculation results, include only results meeting those conditions with the exclusion of results not meeting measurement conditions or calculation conditions in each destination (each country).

Specifically, for example, it may be adapted to select an appropriate one from a list of the target road loads $F_0$ obtained in accordance with the function (5) (for example, select the coefficients $a_0$ and $b_0$ maximizing or minimizing the value of the target road load $F_0$), or to be able to select the average value of the multiple calculation results. At the time of averaging, it may be adapted to calculate the average value after excluding some anomalous calculation results.

The road load data setting part 43 is configured to set target road loads $F_0$ in the chassis dynamometer 1, and here transmits the coefficients $a_0$ and $b_0$ used in the function (5) selected by the selection part 42 to the dynamometer control apparatus 1a for the setting. The road load data setting part 43 may set the target road load $F_0$ in the chassis dynamometer 1 by wire or wireless, or through a medium such as a memory card.

In addition, the management apparatus 4 of the present embodiment further includes an output part 44 adapted to viewably output the target road load $F_0$ to a user before the road load data setting part 43 sets the target road load $F_0$ in the dynamometer control apparatus 1*a*.

The output part 44 is one adapted to output the target road load $F_0$ (the coefficients $a_0$ and $b_0$ here) to be set by the road load data setting part 43 for display on the displays of the management apparatus 4 and the dynamometer control apparatus 1*a*. In addition, the output part 44 may be one adapted to output the target road load $F_0$ as a print.

Meanwhile, in order to obtain actual running data necessary to calculate an actual road load F and a target road load $F_0$, a driver of the actual running vehicle V' is required to perform a number of steps while meeting conditions set for each of the steps.

For this reason, in the present embodiment, as illustrated in FIG. 2, the information processing apparatus 6 equipped in the actual running vehicle V' is configured to further function as a determination part 63 and a guidance part 64 as a result of the cooperation of the CPU and its peripheral devices.

The determination part 63 is one adapted to, on the basis of the pieces of data from the actual running data meter S1 and the environmental data meter S2, determine whether the actual run meets the various conditions set for the coast-down method. In addition, when the environmental data from the environmental data meter S2 does not meet predetermined conditions, the determination part 63 transmits a signal to the actual running data acquisition part 61 to prevent the acquisition of the actual running data.

The guidance part 64 is one adapted to provide a driver with guidance for running the actual running vehicle V' in accordance with the regulations set for the coast-down method during running of the actual running vehicle V', and specifically, sequentially displays guidance contents set for each of the steps on a display equipped in the actual running vehicle V'.

Figure 4:
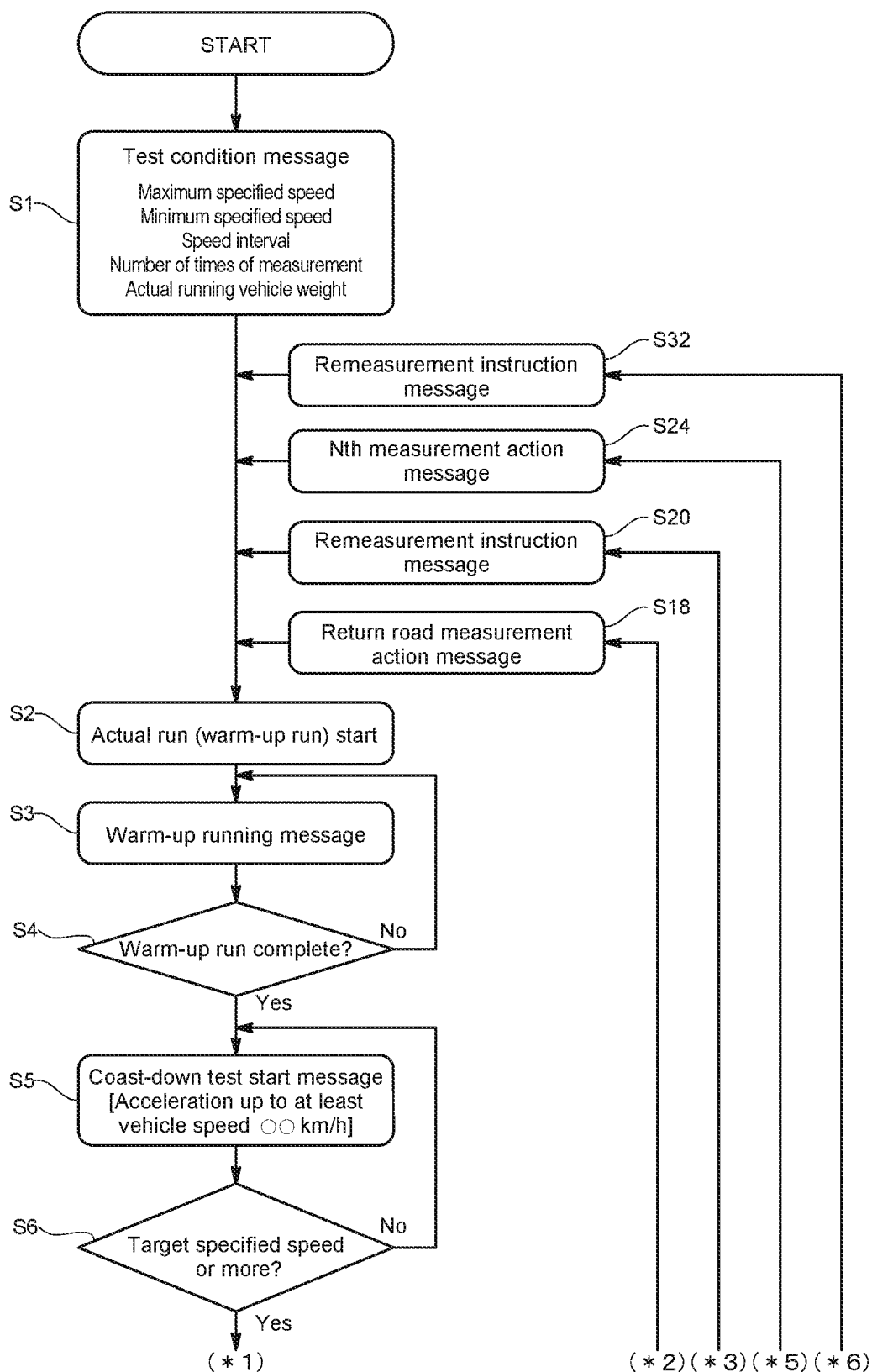
FIG. 4 is a flowchart for explaining the actions of the vehicle test system of the present embodiment.
Figure 5:
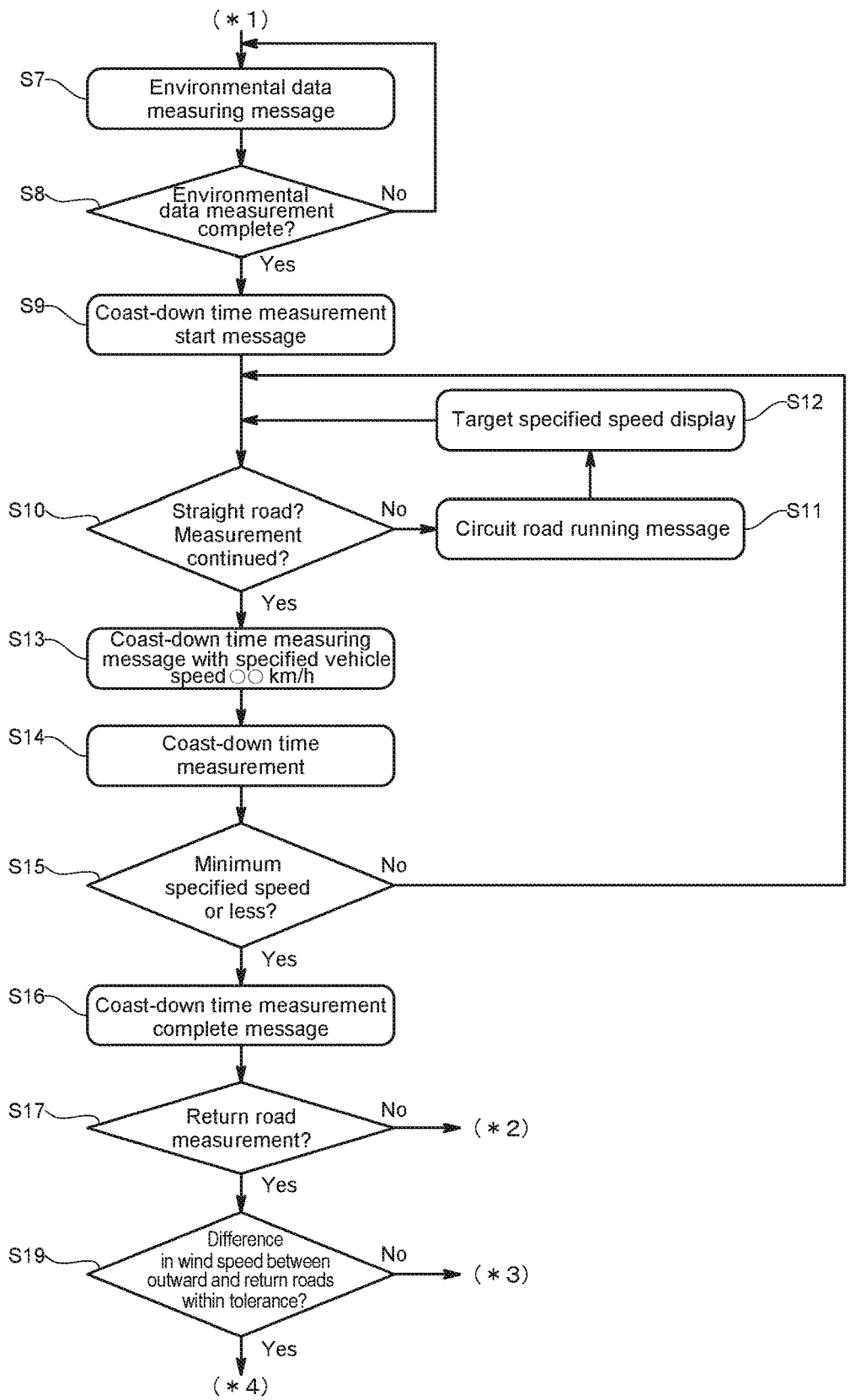
FIG. 5 is a flowchart for explaining the actions of the vehicle test system of the present embodiment.
Figure 6:
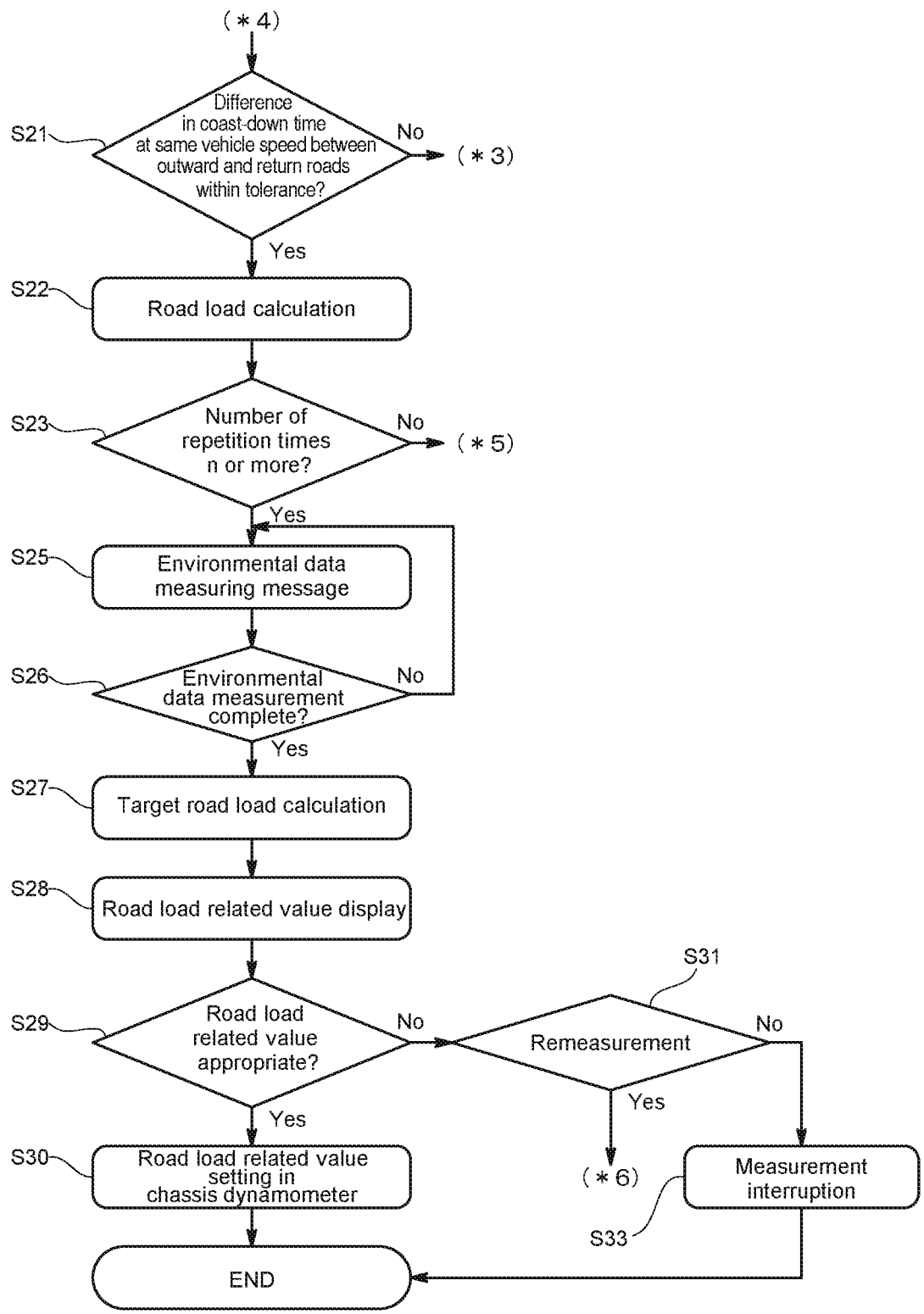
FIG. 6 is a flowchart for explaining the actions of the vehicle test system of the present embodiment.

In the following, a flow up to setting the target road load $F_0$ in the chassis dynamometer 1 will be described with reference to FIGS. 4 to 6 while also describing the determination part 63 and the guidance part 64 in detail.

First, the guidance part 64 displays test conditions preliminarily set by a user to a driver (S1). The test conditions include the maximum and minimum values among the above-described specified speeds (the maximum and minimum specified speeds in the present embodiment are 90 km/h and 20 km/h, respectively), a speed interval indicating what speed intervals (km/h) the actual road load F is calculated at (10 km/h in the present embodiment) within the range between the maximum and minimum specified speeds, the number of times of measurement of the actual road load F, the weight of the actual running vehicle, and the like.

When an actual run is started (S2), in order to start a warm-up run before the start of a coast-down run, the guidance part 64 displays the message "in warm-up run" (S3). Then, when the determination part 63 determines on the basis of a running speed, a running time, or the temperature of the actual running vehicle V' or a tire obtained by an unillustrated temperature sensor that the warm-up run is completed (S4), the guidance part 64 displays the message "coast-down run start" (S5). At this time, the guidance part 64 displays, for example, "acceleration up to at least vehicle speed 90 km/h" as a target specified speed, and consequently the driver having looked at this display can recognize that in order to make the actual running vehicle coast from a speed exceeding the specified speed by 5 km/h, it is only necessary to perform acceleration until the vehicle speed reaches 95 km/h or more.

When the determination part 63 determines that the vehicle speed reaches the displayed target specified speed or more (S6), before measuring a coast-down time, in order to measure environmental data at the start of a test, such as atmospheric pressure, temperature, wind direction, and wind speed, the guidance part 64 displays the message "in environmental data measurement" (S7). Then, when the determination part 63 determines that a predetermined time has passed, and the measurement of the environmental data has completed (S8), the guidance part 64 displays the message "coast-down time measurement start" (S9).

During the coast-down time measurement, while monitoring the statuses of accelerator and steering operations during the measurement, the determination part 63 determines whether the actual running vehicle V' is actually running on a straight road, i.e., the coast-time measurement is continued (S10).

When the determination part 63 determines that the actual running vehicle V' is not actually running on the straight road, because the steering operation has been performed or the measurement has been interrupted for some reason, the guidance part 64 displays the message "in circuit road run" indicating that the actual running vehicle V' is running on a circuit road (S11). At this time, the guidance part 64 displays a target specified speed necessary to reach a next straight road (S12). Describing this in more detail, assuming that, for example, the vehicle speed when the actual running vehicle V' moved from the straight road to the circuit road was 57 km/h, the calculation of an actual road load F at 60 km/h, which requires a coast-down time from 65 km/h to 55 km/h, cannot be performed. For this reason, the guidance part 64 displays the message "acceleration up to at least vehicle speed 65 km/h", and consequently the driver aims at 65 km/h.

On the other hand, when the actual running vehicle V' is keeping coasting on the straight road, a coast-down time is measured, and the guidance part 64 displays the message "in coast-down time measurement" together with a specified vehicle speed at the time (S13). At this time, the coast-down time is measured by a running time meter (S14).

Then, the determination part 63 determines whether a coast-down time at the minimum specified speed has been measured (S15), and when the coast-down time at the minimum specified speed has not been measured, the flow returns to Step S10.

On the other hand, when the measurement of the coast-down time at the minimum specified speed is completed, the guidance part 64 displays the message "coast-down time measurement complete" (S16).

After that, the determination part 63 determines whether the return road measurement is completed (S17), and when the return road measurement is not performed, the flow returns to Step S2.

In addition, at the time of the return road measurement, the guidance part 64 displays the message "return road measurement action" (S18).

When the return road measurement is completed, the determination part 63 determines whether the difference in wind speed before the coast-down time measurement between the outward road and the return road is within a tolerance (S19).

When the difference in wind speed is out of the tolerance, the guidance part 64 displays a message indicating remeasurement (S20), and the flow returns to Step S2.

On the other hand, when the difference in wind speed is within the tolerance, the determination part 63 determines whether the difference in coast-down time at the same vehicle speed between the outward road and the return road is within the tolerance (S21).

When the difference in coast-down time is out of the tolerance, the guidance part 64 displays the message indicating the remeasurement (S20), and the flow returns to Step S2.

On the other hand, when the difference in coast-down time is within the tolerance, the actual road load calculation part 62 calculates the actual road load F using the above-described calculation expression (1) (S22), and transmits the result of the calculation to the management apparatus 4.

Then, when the number of times of the actual road load F calculation meets the number of times of measurement set as a part of the test conditions, the determination part 63 determines that the coast-down run ends (S23), whereas when the number of times of measurement is not met, the flow returns to Step S2. In addition, the number of times of measurement at each time of measurement is displayed by the guidance part 64 (S24).

After the end of the coast-down run, in order to measure environmental data at the end, such as atmospheric pressure, temperature, wind direction, and wind speed, the guidance part 64 displays the message "in environmental data measurement" (S25). Then, when the determination part 63 determines that for example, a predetermined time has passed, and the measurement of the environmental data is completed (S26), the target road load calculation part 41 calculates the target road load $F_0$ on the basis of the actual road load F transmitted by the actual road load calculation part 62 (S27).

In the present embodiment, as described above, the output part 44 is adapted to display the target road load $F_0$ to be set in the chassis dynamometer 1 (S28), and the user checks the value of the target road load $F_0$ to determine whether the value is appropriate as a setting value for the chassis dynamometer (S29), and when the value is determined to be appropriate, the value is transmitted to the chassis dynamometer 1 through the road load data setting part 43 for the setting (S30).

On the other hand, when the target road load $F_0$ displayed by the output part 44 is determined to be inappropriate as the setting value, the user can input an instruction for remeasurement to the management apparatus 4.

The management apparatus 4 determines whether to receive the instruction for remeasurement (S31), and when receiving the instruction, transmits the instruction of the information processing apparatus 6 of the actual running vehicle V'. In doing so, the guidance part 64 displays a message indicating remeasurement (S32), and the flow returns to Step S2.

Note that when determining that the displayed target road load $F_0$ is inappropriate as the setting value, the user may interrupt the measurement without performing the remeasurement (S33).

In the vehicle test system 100 according to the present embodiment configured as described above, since the actual road load calculation part 41 and target road load calculation part 62 as the road load calculation part automatically calculate the actual road load F and the target road load $F_0$, and also the running data setting part 43 automatically sets the target road load $F_0$ in the dynamometer 1, the occurrence of a user's erroneous operation can be prevented.

In addition to this, since the output part 44 displays the target road load $F_0$ to be set in the dynamometer 1, a user can check the value of the target road load $F_0$, and when the checked value is inappropriate, the test can be interrupted or performed again later, thus making it possible to avoid a useless test.

Also, since the selection part 42 automatically selects one or more target road loads $F_0$ meeting the predetermined conditions from among the multiple calculated target road loads $F_0$, an optimum value can be set in the chassis dynamometer 1 from among the multiple calculated target road loads $F_0$.

Further, since the guidance part 64 provides a driver with the guidance for running in accordance with the regulations set for the coast-down method during a run, the driver can actually run the actual running vehicle V' in accordance with the same procedure, and therefore the actual road load F and the target road load $F_0$ can be fairly measured.

In addition, since while monitoring the statuses of accelerator and steering operations during the measurement, the determination part 63 determines whether the actual running vehicle V' is actually running on a straight road, and when the determination part 63 determines that the actual running vehicle V' is not actually running on the straight road, the guidance part 64 displays a target specified speed necessary to reach a next straight road, data necessary to calculate the actual road load F and the target road load $F_0$, can be surely acquired simply in such a way that the driver runs the actual running vehicle in accordance with the guidance.

Note that the present invention is not limited to the above-described embodiment.

For example, in the above-described embodiment, the information processing apparatus 6 equipped in the actual running vehicle is provided with the function as the actual road load calculation part 62; however, the management apparatus 4, the dynamometer control apparatus 1*a*, or the like may be provided with the function as the actual road load calculation part 62.

Also, the dynamometer control apparatus 1*a*, or the information processing apparatus 6 equipped in the actual running vehicle may be provided with some or all of the functions as the target road load calculation part 41, selection part 42, road load data setting part 43, and output part 44.

Figure 7:
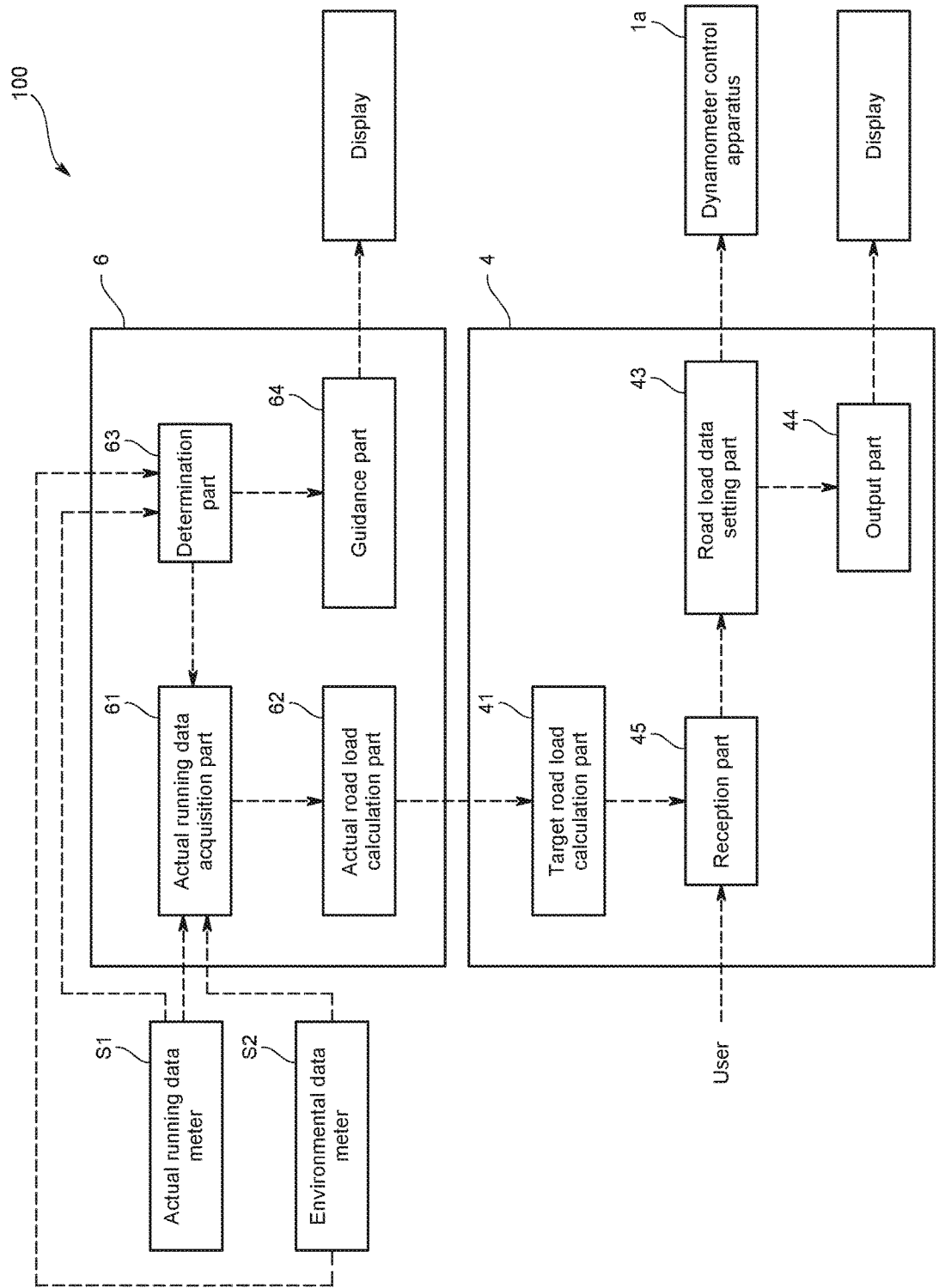
FIG. 7 is a functional block diagram illustrating the functions of a vehicle test system of a variation.

In addition, in the above-described embodiment, the selection part 42 automatically selects one or more target road loads $F_0$ meeting the predetermined conditions from among the multiple target road loads $F_0$ calculated on the basis of the coast-down method; however, as illustrated in FIG. 7, the management apparatus may be provided with a function as a reception part 45 adapted to receive one or more values selected from among the multiple road loads $F_0$ by a user.

Specifically, the reception part 45 displays the multiple target road loads $F_0$ calculated by the target road load calculation part 41 on the display such as a touch panel, and receives one or more values selected from among them by a user to transmit them to the road load data setting part 43.

In addition, the determination part 63 in the above-described embodiment is one adapted to determine whether the actual run by a driver meets the various conditions set for the coast-down method, but may be adapted to, on the basis of the environmental data such as atmospheric pressure, temperature, or wind speed, determine whether the calculated actual road load F or target road load $F_0$ falls within an assumed range, and when it is out of the assumed range, make the guidance part display a message indicating remeasurement.

The guidance part in the above-described embodiment displays the message indicating remeasurement in multiple steps, but may display a message indicating not remeasurement but the interruption of the test.

Further, the output part 44 in the above-described embodiment is one adapted to output the target road load $F_0$ to be set in the chassis dynamometer, but may be adapted to output a value indicated by the environmental data together with the target road load $F_0$. In doing so, even when the target road load $F_0$ has an appropriate value, when the value indicated by the environmental data is anomalous, the actual road load F can be remeasured or the test can be interrupted.

Also, when in order to calculate the target road load $F_0$, for example, it is necessary to input the value indicated by the environmental data in the chassis dynamometer, the above-described configuration in which the output part 44 outputs the value indicated by the environmental data is advantageous.

Still further, in order to make it possible to check whether or not the target road load $F_0$ to be set in the dynamometer is appropriate, the output part 44 may be configured to output the actual running data, which is used to calculate the target road load $F_0$, together with the target road load $F_0$.

Figure 8:
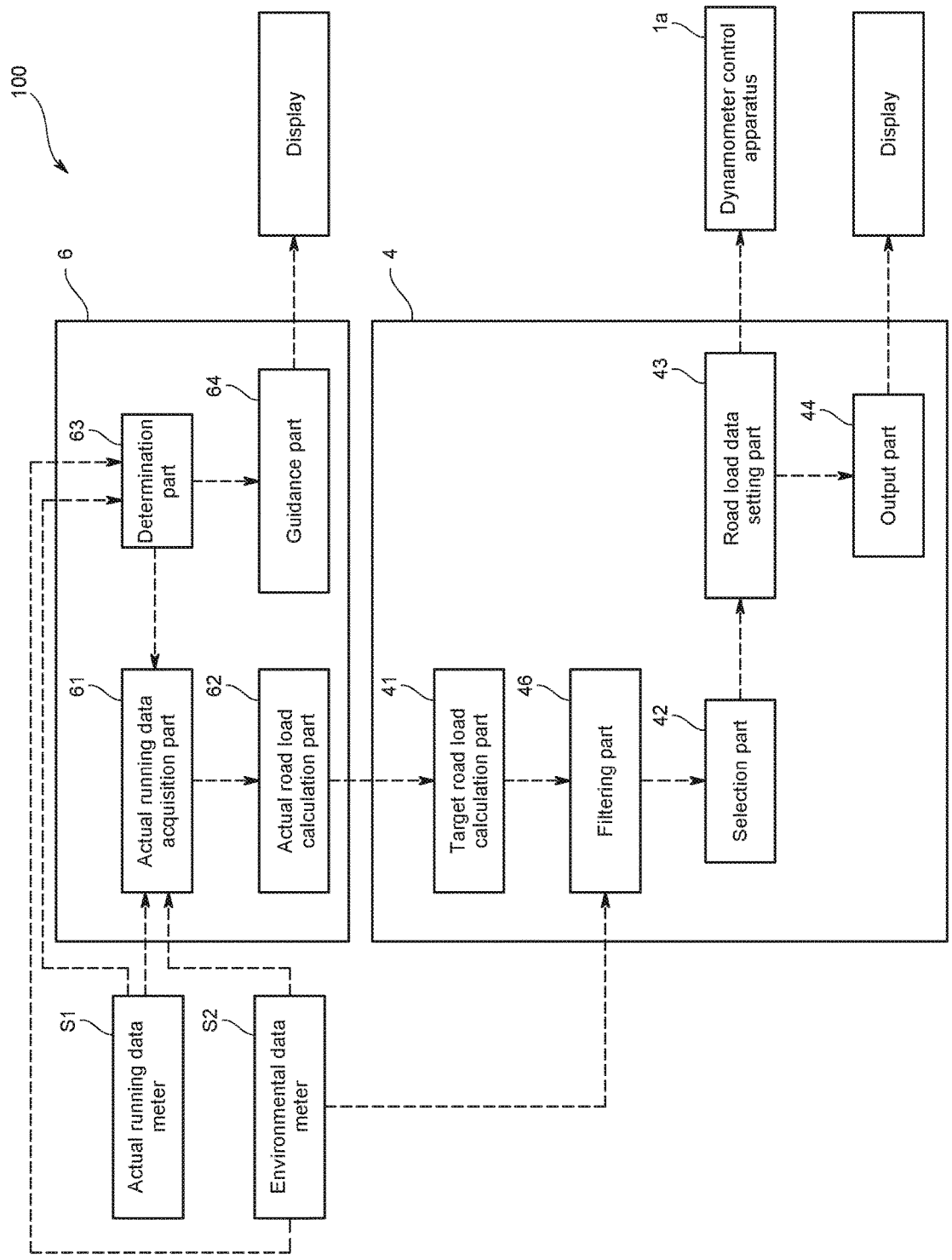
FIG. 8 is a functional block diagram illustrating the functions of a vehicle test system of another variation.

In addition, as illustrated in FIG. 8, the management apparatus 4 may further include a filtering part 46 adapted to, when the environmental data at the time of acquisition of the actual running data does not meet a predetermined environmental condition, exclude the target road loads $F_0$ calculated by the target road load calculation part 41 from the setting by the road load data setting part 43. Note that the predetermined environmental condition refers to a numerical value range predetermined for at least one piece of environmental data among the atmospheric pressure, atmospheric temperature, wind direction, and wind speed obtained when the actual running vehicle V' runs, and is prescribed in rules of each country, such as laws and/or regulations.

The filtering part 46 receives the environmental data from the environmental data meter S2 or receives the environmental data acquired by the actual running data acquisition part 61, and when the value of the environmental data is out of the predetermined range, filters the target road loads $F_0$ calculated using the environmental data, such as deleting the target road loads $F_0$ from the memory.

As an example of the predetermined environmental condition, a condition as a numerical range of wind speed prescribed in TRIAS in which the wind speed has an average wind speed parallel component of 5 m/s or less and an average wind speed vertical component of 2 m/s or less relative to the test road can be cited.

Note that the filtering part 46 may filter the target road loads $F_0$ automatically selected by the selection part 42, filter the actual road load F calculated by the actual road load calculation part 62, or in the variation illustrated in FIG. 7, filter the target road loads $F_0$ received by the reception part 45.

The above-described embodiment uses the functions (2) and (5) respectively representing the actual road load F and the target road load $F_0$ as the squares of the vehicle speed; however, the functions are not limited to them, but may be appropriately changed.

Also, the road load data setting part 43 in the above-described embodiment sets in the chassis dynamometer the coefficients $a_0$ and $b_0$ used in the function (5) as the setting of the target road load $F_0$, but may transmit data indicating the function (5) itself, data indicating the correlation between the target road load $F_0$ and the vehicle speed (e.g., a lookup table), or the value of the target road load $F_0$ itself at each speed to the chassis dynamometer for setting.

Further, the road load data setting part 43 may be adapted to set at least any of the environmental data at the time of acquisition of the actual running data, the vehicle weight of the actual running vehicle V', the vehicle inertia weight of the actual running vehicle V', and a coast-down time during the actual run in the dynamometer 1 together with the target road load $F_0$.

Describing this more specifically, the above-described respective pieces of data are ones used for the calculation of the actual road load F by the actual road load calculation part 62 and the calculation of the target road loads $F_0$ by the target road load calculation part 41, and the road load data setting part 43 acquires these pieces of data from the actual road load calculation part 62 and the target road load calculation part 41 to set any of them in the dynamometer control apparatus 1a. Note that the term "set in the dynamometer" here refers to a state where the pieces of data are inputted to the chassis dynamometer 1 or the dynamometer control apparatus 1a, and the pieces of inputted data do not have to be necessarily used. The same holds true for the above-described embodiment. In addition, it is preferable to store the actual road load F and the target road load $F_0$ in a memory in connection with the actual running data used to calculate them and the environmental data at the time of acquisition of the actual running data, and the memory is only required to be included in the dynamometer control apparatus 1a, the management apparatus 4, the information processing apparatus 6, an external server, or the like.

This configuration allows the dynamometer control apparatus 1a to calculate the actual road load F and the target road loads $F_0$, and therefore it can be verified whether the set target road load $F_0$ is correct.

The guidance part 64 may be one capable of, without limitation to the coast-down method, providing guidance for various calculation methods for calculating the actual road load F and target road loads $F_0$. For example, by providing guidance for a calculation method conforming to laws and regulations of each country, the actual road load F and the target road loads $F_0$ can be measured in accordance with a correct method conforming to laws and regulations of each country.

Further, the vehicle test system of the above-described embodiment is one adapted to test a finished vehicle, but for example, may be one adapted to test the performance of an engine using an engine dynamometer or the performance of a power train using a dynamometer.

Besides, it should be appreciated that the present is not limited to any of the above-described embodiment and variations, but can be variously modified without departing from the scope thereof.

REFERENCE SIGNS LIST

100: Vehicle test system
1: Chassis dynamometer
41: Target road load calculation part
42: Selection part
43: Road load data setting part
44: Output part
61: Actual running data acquisition part
62: Actual road load calculation part

The invention claimed is:

1. A vehicle test system that tests performance of a vehicle or a part of the vehicle, the vehicle test system comprising:
at least one processor adapted to acquire actual running data from an actual running vehicle running on a road, wherein the actual running data includes at least coast down times obtained during a coast down run on the road, calculate an actual road load on a basis of the actual running data and a coast down method;

compensate a value corresponding to rolling resistance and a value corresponding to air resistance coefficient in accordance with an average temperature at the road or an average atmospheric pressure at the road, the compensated value corresponding to rolling resistance being $a_0$ and the compensated value corresponding to air resistance coefficient being $b_0$, compensate the actual road load using the compensated values $a_0$ and $b_0$ to calculate a target road load, set the target road load in a dynamometer such that the dynamometer provides a load to the vehicle or the part of the vehicle according to the target road load to test the performance of the vehicle or the part of the vehicle, and before the setting in the dynamometer, viewably output the compensated values $a_0$ and $b_0$ to a display or as a print, wherein the vehicle test system does not provide any interface allowing a user to edit the compensated values $a_0$ and $b_0$, preventing the user from editing the compensated values $a_0$ and $b_0$.

2. The vehicle test system according to claim 1, wherein the target road load is a value calculated in accordance with a predetermined regulation, and the at least one processor is further adapted to receive one or more values selected by the user from among multiple target road loads calculated in accordance with the predetermined regulation, and set the target road loads received by the at least one processor.

3. The vehicle test system according to claim 1, wherein the target road load is a value calculated in accordance with a predetermined regulation, and the at least one processor is further adapted to automatically select one or more target road loads meeting a predetermined condition from among multiple target road loads calculated in accordance with the predetermined regulation, and set the target road loads selected by the at least one processor in the dynamometer.

4. The vehicle test system according to claim 1, wherein the at least one processor is further adapted to, when environmental data at a time of the acquisition of the actual running data does not meet a predetermined environmental condition, exclude the target road load calculated by the at least one processor from the setting by the at least one processor.

5. The vehicle test system according to claim 1, wherein the at least one processor sets environmental data at a time of the acquisition of the actual running data in the dynamometer together with the target road load.

6. The vehicle test system according to claim 1, wherein the at least one processor sets at least any of vehicle weight of the actual running vehicle, vehicle inertia weight of the actual running vehicle, and a coast-down time during an actual run in the dynamometer together with the target road load.

7. The vehicle test system according to claim 2, wherein the at least one processor is further adapted to provide guidance for running in accordance with the predetermined regulation to a driver during a run of the actual running vehicle.

8. The vehicle test system according to claim 7, wherein when environmental data at a time of the acquisition of the actual running data does not meet a predetermined condition, the guidance part provides guidance for indicating interruption of the test or remeasurement.

9. The vehicle test system according to claim 1, comprising the dynamometer.

10. A vehicle test method that is used for a vehicle test system comprising a dynamometer, the vehicle test method comprising:

calculating an actual road load on a basis of a coast down method and actual running data acquired from an actual running vehicle on a road;

compensating a value corresponding to rolling resistance and a value corresponding to air resistance coefficient in accordance with an average temperature at the road or an average atmospheric pressure at the road, the compensated value corresponding to rolling resistance being $a_0$ and the compensated value corresponding to air resistance coefficient being $b_0$;

compensating the actual road load using the compensated values $a_0$ and $b_0$ to calculate a target road load;

setting the target road load in the dynamometer such that the dynamometer provides a load to a vehicle or part of the vehicle according to the target road load to test performance of the vehicle or the part of the vehicle; and before the setting in the dynamometer, viewably outputting the compensated values $a_0$ and $b_0$ to a display or as a print, without providing any interface allowing a user to edit the compensated values $a_0$ and $b_0$, preventing the user from editing the compensated values $a_0$ and $b_0$.

11. A vehicle test system that tests performance of a vehicle or a part of the vehicle by a coast down method, the vehicle test system comprising:

at least one processor adapted to acquire actual running data from an actual running vehicle running on a road, wherein the actual running data includes at least coast down times obtained during a coast down run on the road, calculate an actual road load on a basis of the actual running data and a coast down method;

compensate a value corresponding to rolling resistance and a value corresponding to air resistance coefficient in accordance with an average temperature at the road or an average atmospheric pressure at the road, the compensated value corresponding to rolling resistance being $a_0$ and the compensated value corresponding to air resistance coefficient being $b_0$;

compensate the actual road load using the compensated values $a_0$ and $b_0$ to calculate a target road load, set the target road load in a dynamometer such that the dynamometer provides a load to the vehicle or the part of the vehicle according to the target road load to test the performance of the vehicle or the part of the vehicle, and before the setting in the dynamometer, prevent a user from editing the compensated values $a_0$ and $b_0$, wherein the vehicle test system does not provide any interface allowing the user to edit the compensated values $a_0$ and $b_0$.

12. The vehicle test system of claim 11, wherein the at least one processor is further adapted to, before the setting in the dynamometer, viewably output the target road load to a display or as a print.

* * * * *